Patented Oct. 27, 1942

2,299,830

UNITED STATES PATENT OFFICE 2,299,830

METHOD OF RECOVERING HYDROCARBONS

Harold R. Legatski, Will Swerdloff, and Gerald W. McCullough, Bartlesville, Okla., assignors to Phillips Petroleum Company, a corporation of Delaware Application December 21, 1937, Serial No. 181,053

8 Claims. (Cl. 196—8)

This invention relates to an improved method for recovering all but the most volatile fraction of hydrocarbon gases.

An important object of the invention is to recover a greater amount of the desirable fractions without increasing the distillation equipment.

A further important object of the invention is to recover a larger amount of the lighter or more volatile desirable fractions without unduly increasing the recovery of the more volatile undesirable fractions.

A still further object of the invention is to effect a rough separation of the absorbed components according to volatility.

Referring to the drawings.

Figure 1:
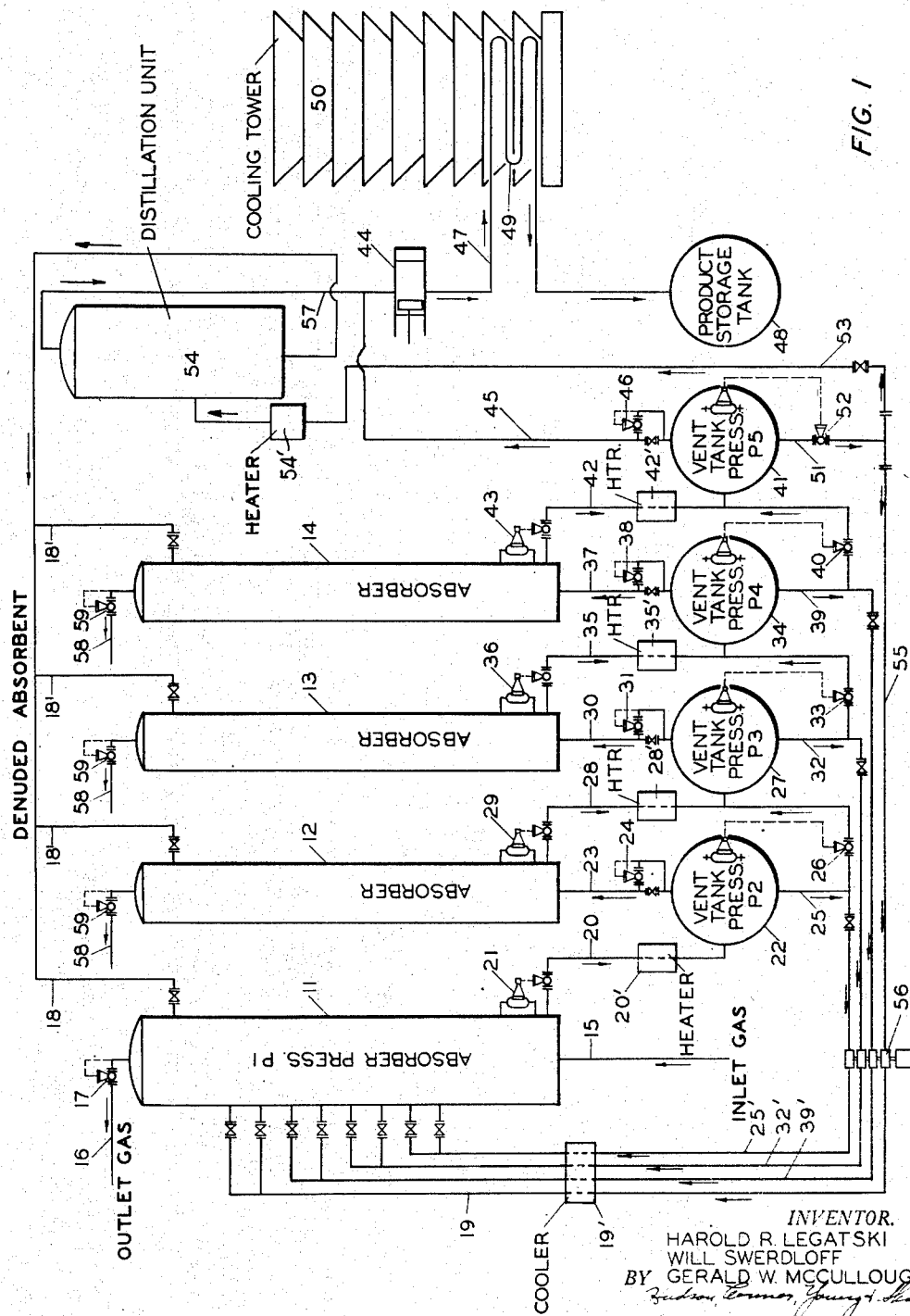
Fig. 1 is a diagrammatic view of a system embodying the present invention.

Referring to Fig. 1, a main absorber is shown at 11 and supplemental absorbers at 12, 13 and 14. A gas admission pipe 15 enters the lower part of absorber 11 and a residue gas pipe 16 is arranged at its upper end having a back pressure regulator 17. Pipes 18, 19, 25', 32', and 39' are connected to absorber 11 for the admission of absorption oil, pipes 19, 25', 32' and 39' having branches for admitting the oil at various plates of the absorber. Connected to the lower end of absorber 11 is a rich absorption oil pipe 20 controlled by level control 21 and connected to a vent tank 22. The vapor space in vent tank 22 is connected by pipe 23 controlled by back pressure regulator 24 to the lower end of absorber 12. A pipe 25 for absorption oil, controlled by level controller 26, connects vent tank 22 with a second vent tank 27. The lower end of absorber 12 is also connected to vent tank 27 for absorption oil flow through a pipe 28 controlled by level control 29. The vapor space of vent tank 27 is connected by pipe 30, controlled by back pressure regulator 31, with the lower end of absorber 13. A pipe 32 for absorption oil, controlled by level control 33, connects vent tank 27 with a third vent tank 34. A pipe 35 for absorption oil, controlled by level controller 36, also connects the lower end of absorber 13 with vent tank 34. The vapor space of vent tank 34 is connected with the lower end of absorber 14 through a pipe 37 controlled by back pressure regulator 38. A pipe 39 for absorption oil, controlled by level controller 40, connects vent tank 34 with a fourth vent tank 41. Absorber 14 is also connected with vent tank 41 for absorption oil flow through pipe 42 controlled by level control 43. Between the vent tanks and the level controllers, pipes 25, 32 and 39 are each connected with pipes 25', 32' and 39' respectively. The vapor space of vent tank 41 is connected with a compressor 44 through pipe 45 controlled by back pressure regulator 46. The discharge from compressor 44 by means of pipe 47 is connected to a storage tank 48, pipe 47 having a cooling section 49 in cooling tower 50. Connected to vent tank 41 is a pipe 51 for absorption oil controlled by level control 52 having a branch 53 going to a conventional distillation unit 54 through a heater 54' and a branch 55 going through pump 56 to pipe 19. The overhead from distillation unit 54 can pass to cooling section 49 or any other condenser through pipe 57, the lean oil from the distillation unit passing to pipe 18. Pipe 18 has branches 18' to conduct lean oil to the top of each of the absorbers 12, 13 and 14. These latter absorbers have residue gas pipes 58 having back pressure regulators 59. Heaters 20', 28', 35' and 42' are shown in pipes 20, 28, 35 and 42, and pipes 19, 25', 32', and 39' pass through cooler 19'. The usual hand valves and meters are shown in their desirable locations.

As shown in Fig. 1, a stream of partially denuded absorbent from pipe 19 is introduced into absorber 11 at one or more appropriate points below the top plate. In order that no valuable constituents may be lost in the residue by stripping of the partially denuded absorbent, a stream of denuded absorbent from pipe 18 is introduced at the top plate to recover any stripped portion. Below the point of entry of partially denuded absorbent both liquid streams merge to give an effect of high absorbent rate in the bottom section of the absorber.

Heaters 20', 28', 35' and 42' may be used if desired either with or without pressure reduction. Pressure reduction and addition of heat are substantially equivalent when venting a vapor of high methane content but where other vapors are present in solution the two methods have different results. Table I shows various methods of recovering vapors from a rich oil having a vapor pressure of 160 pounds at 70° F. The various steps taken to secure substantially equivalent propane vaporization, shown in parentheses, do not yield equivalent amounts of other vaporized components.

TABLE I
Rich oil

| Absolute pressure | 160# |
| Temperature | 70° |

| Absolute pressure | 75# | 75# | | | |
|---|---|---|---|---|---|
| Temperature | 150° | 70° | | | |
| % unvaporized | | | | | |
| Methane | 28.07 | 42.74 | | | |
| Ethane | 65.71 | 85.00 | | | |
| Propane | 84.63 | 95.46 | | | |
| Butanes | 93.28 | 98.41 | | | |
| Pentanes | 97.47 | 99.52 | | | |
| Hexanes | 98.92 | 99.83 | | | |
| Oil | 100.00 | 100.00 | | | |

| Absolute pressure | 15# | 15# | | | 35# |
|---|---|---|---|---|---|
| Temperature | 150° | 70° | | | 150° |
| % Unvaporized | | | | | |
| Methane | 1.57 | 3.81 | | | 6.34 |
| Ethane | 14.71 | 36.43 | | | 42.52 |
| Propane | 38.79 | (70.78) | | | (70.92) |
| Butanes | 63.68 | 88.44 | | | 86.67 |
| Pentanes | 83.80 | 96.42 | | | 94.93 |
| Hexanes | 92.42 | 98.67 | | | 97.83 |
| Oil | 100.00 | 100.00 | | | 100.00 |

| Absolute pressure | 3# | 3# | 7.8# | 3# | 8# |
|---|---|---|---|---|---|
| Temperature | 150° | 70° | 150° | 250° | 150° |
| % unvaporized | | | | | |
| Methane | 0.03 | 0.01 | 0.13 | 0.03 | 0.21 |
| Ethane | 0.95 | 4.00 | 50.4 | 0.66 | 5.95 |
| Propane | 6.62 | (22.46) | (22.69) | 3.03 | (22.79) |
| Butanes | 21.83 | 52.12 | 48.60 | 7.86 | 47.5? |
| Pentanes | 50.00 | 80.17 | 74.67 | 17.90 | 73.71 |
| Hexanes | 71.50 | 92.00 | 87.75 | 31.08 | 87.00 |
| Oil | 100.00 | 100.00 | 100.00 | 100.00 | 100.00 |

In the present case the use of heater 20' is often not desirable from a technical viewpoint because in the vapors evolved less methane is present at higher temperatures and equivalent pressures than when using low temperatures and low pressure. In such instance the methane can be vented at low temperature and pressure in tank 22 and heat added before tanks 27, 34 and 41 for removal of the heavier fractions. As brought out by Table I distillation unit 54 can be omitted by designing the pressure and temperature differentials between the vent tanks so as to arrive at pressures of 2.5 to 3.5 pounds per square inch and temperatures of 250 to 300° F. in vent tank 41. These conditions will yield the same degree of denudation now used in gasoline plants for butane and heavier recovery. In such event pipe 53 would be closed.

To supplement the desired vaporization at any point in the applicant's system, the usual expedient of a stripping agent can be used. The liberation of dissolved gases and vapors is referred to in this specification as vaporization of such components or ebullition of the absorbent in which they are dissolved, whether it is caused by raising temperature, lowering pressure, or any other known expedient or any combination of them.

Rich absorbent leaves the bottom of absorber 11 through pipe 20 and enters vent tank 22 operating at a pressure $P_2$ which is less than pressure $P_1$ on absorber 11. Vapors evolved due to ebullition of the absorbent in tank 22 pass directly through pipe 23 to absorber 12 operating at pressure $P_2$ less pressure drop in regulator 24, where the heavier fractions are absorbed by a denuded absorbent stream entering at the top from pipe 18'. Rich absorbent from absorber 12 and flashed absorbent from vent tank 22 pass to vent tank 27 where pressure is again dropped to flash absorbed constituents. The same sequence of operations, namely, selectively flashing and reabsorbing occurs in vent tank 27 and absorber 13 and in vent tank 34 and absorber 14. It is obvious that this operation could continue as long as the pressure differential between succeeding vent tanks is great enough to induce sufficient vaporization.

Rich absorbent, after successive flash vaporization and reabsorption of evolved vapors to retain low vapor pressure material, is finally flashed in vent tank 41 to pressure $P_5$ which is as low as economically practical in order to induce a maximum vaporization of absorbed constituents. Vapors are recovered as liquid product by compression at 44 and subsequent cooling at 49.

Partially denuded absorbent from vent tank 41 is divided into two streams, one being pumped through pipe 55, pump 56, and pipe 19 directly back to absorber 11 and the other being sent through pipe 53 to a conventional distillation unit 54 for removal of all absorbed material. This distillate is shown as going directly to storage tank 48 along with compression product although its composition may warrant special storage to facilitate later purification operations.

The absorption oil in vent tanks 22, 27 and 34 is denuded in increasing degree in the order named. If desired part of the oil from each vent may be recycled to absorber 11 through pipes 25', 32' and 39', each such pipe having branches to respectively higher plates in the intermediate section of the absorber.

Figure 2:
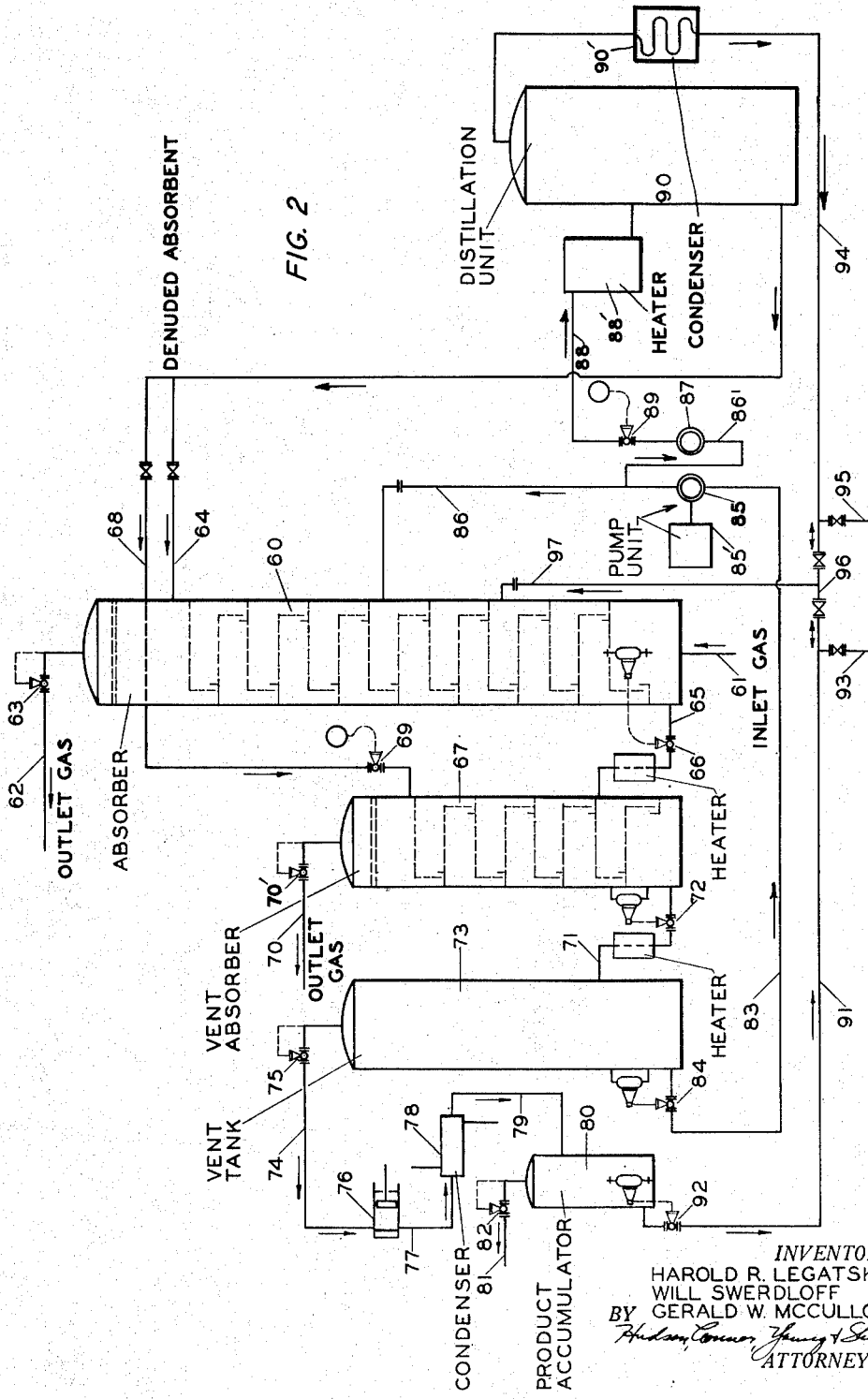
Fig. 2 is a diagrammatic view of a system embodying a modification.

In Fig. 2 is shown a modification of the apparatus and method of Fig. 1. In this figure reference numeral 60 indicates an absorber having a gas inlet pipe 61 and a residue gas pipe 62 having a back pressure regulator 63. The pipe 64 is connected with absorber 60 at the top plate for the admission of absorption oil and a pipe 65 controlled by level control 66 is connected with the lower end of the absorber for the eduction of absorption oil to the lower end of combination vent tank and absorber 67. A pipe 68 having rate of flow control 69 admits lean oil to the top plate of the absorber section of tank 67. A residue gas pipe 70 having back pressure regulator 70', is connected to the top of tank 67. Absorption oil pipe 71 controlled by level control 72 connects the lower end of tank 67 with a vent tank 73, the upper end of vent tank 73 having a product pipe 74 controlled by back pressure regulator 75, which leads to a compressor 76, the discharge of which in turn is connected by a pipe 77 with condenser 78. The condensate and uncondensable products are conducted from condenser 78 through pipe 79 to product accumulator 80, the uncondensable products passing off through pipe 81 controlled by back pressure regulator 82. Absorption oil pipe 83 controlled by level control 84 is connected to the lower end of tank 73 which passes to a pump 85 driven by motor 85'. Output pipe 86 from pump 85 has a branch 86 leading to a second pump 87 driven by motor 85' which has output pipe 88 controlled by rate of flow controller 89. Pipe 88 leads to a distillation unit 90 and has interposed in it before unit 90 a heater 88'. The overhead from distillation unit 90 passes to a condenser 90' wherein steam still product is condensed. The main line of pipe 86 goes to an intermediate plate of absorber 60. A re-compressor product pipe 91 controlled by level control 92 connects with storage pipe 93. Steam still product pipe 94 connects with storage pipe 95. Pipes 93 and 95 are connected by a pipe 96 which in turn is connected with pipe 97 going to absorber 60 at a plate lower than that to which pipe 86 is connected.

In the operation of the modification shown in Fig. 2, partially denuded oil is introduced into a multi-plate absorber 60 at an intermediate plate through pipe 86. At the top of the same absorber, lean oil enters through pipe 64 and absorbs vapors rising from the plate at which the undenuded oil enters. The denuded oil becomes partly saturated as it descends the column and joins with the partially denuded oil at the latter oil's point of entrance. The rate of partially denuded oil flow is greater than that of the lean oil. The applicants found that a ratio of three to one was satisfactory for the types of gases tested. The combined stream of oil then flows down the remainder of the column becoming saturated with the entering gas.

By recycling a portion of the recompressor or steam still product, or both, through pipe 97, into the first absorber at a point below the point of entry of the flash-vented oil, the combined liquid flowing down to the base of the absorber becomes further saturated with the entering gas. The product to be recycled can be controlled as to molecular weight or vapor pressure by mixing the recompressor and steam still products.

The rich oil is then passed through a flash-vent absorber 67 operating at a low pressure as a step for removing the lightest fractions, in the present instance, methane. The flash-vent absorber is a combination vent tank and reabsorber with just enough lean oil entering at 69 to reabsorb the heavier fractions of the vented vapors.

After the oil is demethanized, it is flashed in vent tank 73 which may be operated under vacuum, the vapor evolved in this step being product. The partially denuded oil leaving the last vent is divided into two streams 86 and 86', one being the partially denuded oil going to the first absorber, and the other going to the distillation unit 90 where it is denuded. The lean oil goes to the top of the main absorber 60 through pipe 64 and the flash-vent absorber through pipe 68.

The advantage of this combination absorption system is that it increases the amount of hydrocarbons to be recovered from a gas by circulating more absorption oil or low molecular weight hydrocarbon liquid, and denuding the enriched oil without increasing steam still or heating requirements. Product is recovered from the additional amount of absorption oil by flashing the rich oil in a vent tank operating under vacuum. In other words, this absorption system substitutes compressors required for producing vacuum for heat distillation units. Although only one flash-vent absorber is shown, several could be used, the number depending on the working pressure of the first absorber and the degree of demethanization desired.

Figure 3:
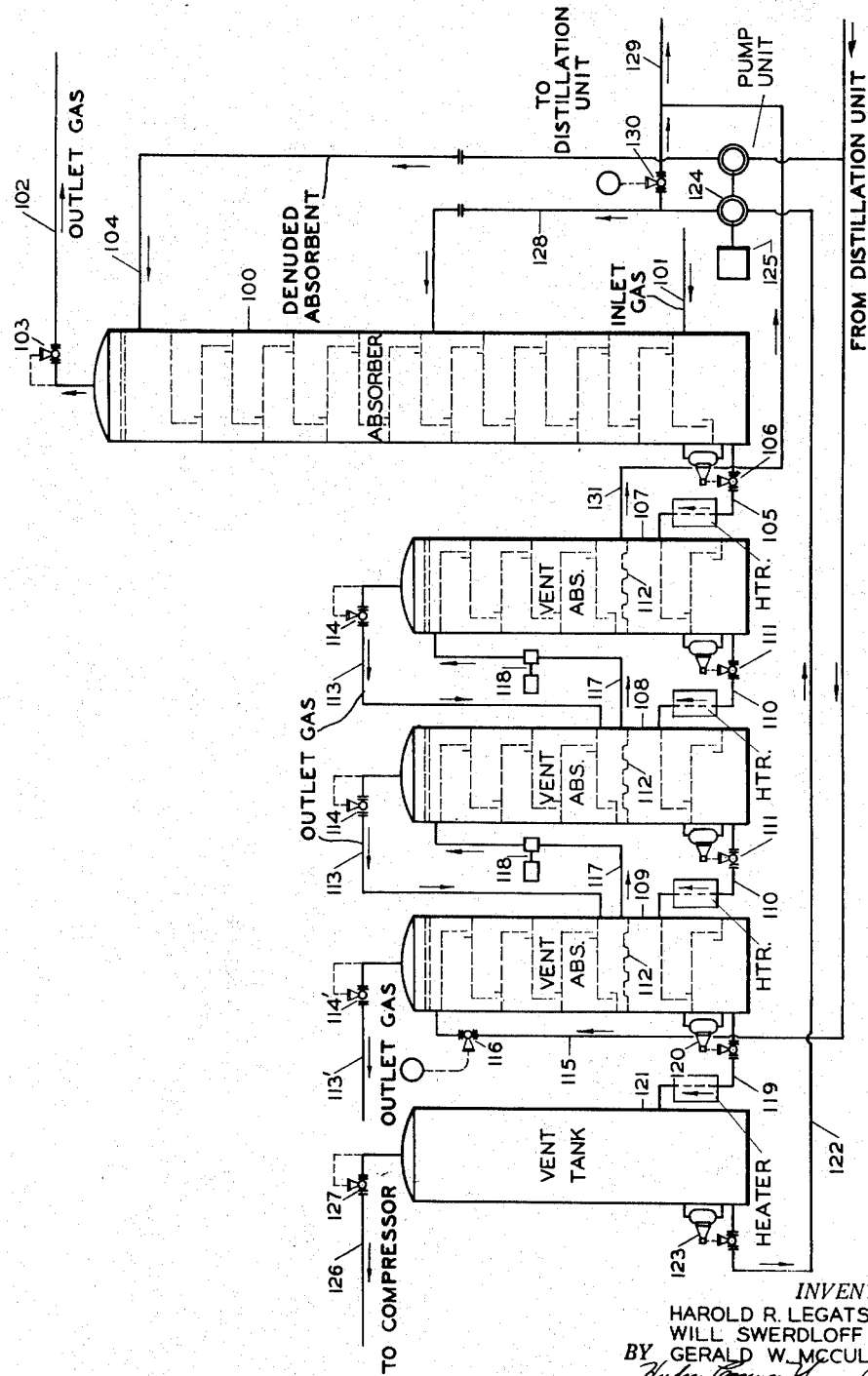
Fig. 3 is a diagrammatic view of a system embodying a further modification.

Fig. 3 shows a further modification of the apparatus and method. In this figure an absorber is shown at 100 having a gas input pipe 101 and a residue gas pipe 102, the latter having a back pressure regulator 103. Lean oil pipe 104 connects with absorber 100 at the top plate and rich absorption oil pipe 105 controlled by level controller 106 connects the lower end of absorber 100 with the lower end of a combination vent tank and absorber 107. Combination vent tank and absorbers 108 and 109, identical with 107, have their lower ends connected for absorption oil flow through pipes 110 controlled by level controllers 111. Part way up in the absorber section of tanks 107, 108 and 109 are located partitions 112 which permit gas to pass upwardly through them but prohibit the passage of oil downwardly. Pipes 113 controlled by back pressure regulators 114 connect the upper end of tanks 107 and 108 with the lower portion of the absorber section of tanks 108 and 109 respectively. Pipe 113' controlled by back pressure regulator 114', connects the top of tank 109 with the residue gas line. A lean oil pipe 115 controlled by rate of flow controller 116 is connected with a top plate of tank 109. Pipe 117 having pumps 118 connect the absorber section of tanks 109 and 108 above the partitions 112 with the top plate of the absorber sections of tanks 108 and 107 respectively. Absorption oil pipe 119 controlled by level control 120 connects the lower end of tank 109 with a vent tank 121. Absorption oil pipe 122 controlled by level control 123 is connected with the lower end of vent tank 121 and passes to a pump 124 driven by motor 125. A pipe 126 having a back pressure regulator 127 is connected to the upper end of vent tank 121 to conduct product to compressors. The output of pump 124 passes into pipe 128 which has a branch 129 controlled by rate of flow controller 130 connecting with a conventional distilling unit. Pipe 128 enters absorber 100 at intermediate plate. Absorption oil pipe 131 is connected to the absorber section of tank 107 above and adjacent partition 112 and joins with pipe 128.

In the operation of this modification flash-vented oil is introduced into absorber 100 several plates below the top. At the top of the same absorber lean oil is added and flows down the column absorbing vapors rising from the point at which the flash-vented oil enters. At the point of entrance of the partially denuded oil the two streams combine and flow down the remainder of the column becoming enriched with the entering gas.

The rich oil is then passed to vent-absorber 107, which is at a lower pressure than absorber 100. Flashing occurs in tank 107, the flashed vapors passing through partition 112 to the absorbing section of the vent-absorber, the oil passing on to the next two vent-absorbers 108, 109 which are at successively lower pressures than 107 and where the same action is repeated. The unabsorbed flashed vapors after passing through the absorber section of tank 107 are passed through pipe 113 to the absorber section of tank 108 where they are joined by vapors flashed in that tank. From the top of 108 the unabsorbed vapors go to 109 and then to the residue gas line through pipe 113'. Lean oil from pipe 115 is admitted to the top of the absorbing section of tank 109 and passes downwardly in contact with the flashed vapors, its rate of flow being sufficient to absorb only the lower vapor pressure components. The enriched oil is withdrawn through pipe 117 and pumped into the top of the absorbing section of tank 108, from the lower end of which absorbing section it is pumped into the top of 107. The absorbing action of the oil is maintained in 108 and 107 by the increased pressure in each case. The rich oil leaving 107 is sent to the distillation unit through pipe 131. The foregoing steps demethanize the rich oil from absorber 100 while recovering the higher boiling constituents from the flashed vapors.

After demethanization the rich oil that has been venting in the vent-absorbers 107, 108 and 109 is passed through pipe 119 to a vent tank 121, which may be, if desirable, operating at vacuum. The vapors here evolved are product. The oil leaving the vent tank is divided into two streams 128 and 129, one being the flash-vented oil that goes to the first absorber and the other going to the distillation unit where it is denuded by heat distillation. This lean oil then goes to the top of the first absorber through pipe 104 and to the vent-absorber operating at lowest pressure through pipe 115.

In the systems of Figs. 2 and 3 the heater or stripping may be used instead of pressure venting, or any combination of these methods may be used as in the system of Fig. 1.

This absorption system has all of the advantages of the others already described, and in addition it overcomes an objection in other systems combining flash-flood absorption and the conventional distillation method. The fault lies in the fact that while absorption in the first absorber depends on the degree of denuding of the flash-vented oil, vented components of the oil flashing in vent tanks are replaced when the oil from the reabsorbers is allowed to join the venting oil. As a result not only are some of the flashed hydrocarbons returned, but more absorption oil is added. This all tends to decrease the amount of vapor evolved in the final vent tank and causes a less denuded oil to be recycled to the first absorber. Since the absorbing oil in the vent-absorbers is kept separate from the venting oil in the instant system, the denuding of oil by flashing in the final vent tank is a maximum.

The amount of lean oil entering the vent-absorber operating at lowest pressure, namely 109, will be ample for the other absorbers since the largest volume of gas is evolved in that vent-absorber and furthermore its solvent power is maintained by increasing the pressure on it in each vent-absorber. The vapors leaving the vent-absorbers are sent to the next vent-absorber so there will be no loss of heavier constituents. Although the vent tank and reabsorber arrangement here described is applied where the vent tank and reabsorber are in one piece of equipment, it may be applied where vent tank and reabsorber are two separate and distinct pieces of apparatus.

We claim:

1. The process of treating hydrocarbon gas comprising passing a stream of said gas in countercurrent relation to a stream of denuded absorption liquid in an absorption zone having initial and final points of contact between said gas and said absorption liquid, passing liquid effluent of said absorption zone to an ebullition zone, condensing resulting vaporous effluent from said ebullition zone to form a high vapor pressure product, passing liquid effluent from said ebullition zone to a distillation zone, condensing the vaporous effluent from said distillation zone to form a low vapor pressure product and recycling a controlled mixture of said products to said absorption zone at a point intermediate of said initial and final points.

2. The process of treating hydrocarbon gas comprising passing a stream of said gas in countercurrent relation to a stream of denuded absorption liquid in an absorption zone having initial and final points of contact of said streams relative to gas flow, passing liquid effluent of said absorption zone to a second zone wherein ebullition of said effluent takes place, passing liquid effluent of said second zone to a third zone wherein ebullition of said effluent of said second zone takes place, recycling liquid effluent of said second zone to said absorber at an intermediate point in relation to said initial and final points, and recycling liquid effluent of said third zone to said absorber at a point between said intermediate point and said final point.

3. The process of treating hydrocarbon gas comprising passing a stream of said gas in countercurrent relation to a stream of absorption liquid in an absorption zone having initial and final points of contact between said streams relative to gas flow, passing liquid effluent of said absorption zone through a plurality of ebullition zones in series, each succeeding ebullition zone having an increased temperature, recycling liquid effluent of a first ebullition zone to said absorption zone at an intermediate point in relation to said initial and final points, and recycling liquid effluent of a second ebullition zone having a higher temperature than said first ebullition zone, to said absorption zone at a point between said intermediate point and said final point.

4. The process of treating hydrocarbon gas comprising contacting a stream of the gas with a first stream of absorption liquid in an absorption zone having initial and final points relative to gas flow whereby the absorption liquid becomes enriched with the gas, introducing a second stream of absorption liquid to said absorption zone intermediate the initial and final points to join the first stream of absorption liquid, withdrawing the combined streams of enriched absorption liquid from the absorption zone at the initial point, passing enriched absorption liquid through a plurality of ebullition zones in succession, each succeeding ebullition zone having lower pressure than that preceding, recycling liquid effluent from an ebullition zone to the absorption zone to form said second stream of absorption liquid, passing the vaporous effluent of the first ebullition zone in contact with a third stream of absorption liquid to enrich the same, passing enriched absorption liquid to a distillation zone to denude the same, recycling denuded absorption liquid to the absorption zone at said final point to comprise said first stream of absorption liquid, and condensing vaporous effluent of the last ebullition zone and the distillation zone as product.

5. The process of treating hydrocarbon gas comprising contacting a stream of the gas with a first stream of absorption liquid in an absorption zone having initial and final points relative to gas flow whereby the absorption liquid becomes enriched with the gas, introducing a second stream of absorption liquid to said absorption zone intermediate the initial and final points to join the first stream of absorption liquid, withdrawing the combined streams of enriched absorption liquid from the absorption zone at the initial point, passing enriched absorption oil from the absorption zone to an ebullition zone, recycling a portion of the liquid effluent of the ebullition zone to the absorption zone to comprise said second stream of absorption liquid, denuding the remaining enriched absorption liquid in a distillation zone, passing the denuded absorption liquid to the absorption zone at said final point to comprise said first stream of absorption liquid, and passing a stream of the distillate from said distillation zone to said absorption zone at a point between said intermediate point and said initial point.

6. The process of treating hydrocarbon gas comprising passing a stream of said gas in countercurrent relation to a stream of denuded absorption liquid in an absorption zone having initial and final points of contact of said streams relative to gas flow, introducing a stream of partially denuded absorption liquid at a point intermediate said initial and final points of said absorption zone, passing effluent of the absorption zone to an ebullition zone, contacting the vaporous effluent of the ebullition zone with a second absorption liquid to enrich the same with the heavier fractions thereof, passing liquid effluent from the ebullition zone and enriched second absorption liquid to a second ebullition zone, passing liquid effluent of the second ebullition zone to the absorber as said partially denuded absorption liquid, passing undenuded absorption liquid to a still to denude the same, and passing the denuded absorption liquid to the absorption zone as said stream of denuded absorption liquid.

7. The process of treating hydrocarbon gas comprising contacting the gas with an absorption liquid in a first absorption zone, passing the effluent of the first absorption zone through a plurality of ebullition zones in series, passing the vaporous effluent of each ebullition zone to separate reabsorption zones and passing a second absorption liquid through the reabsorption zones in series but in the opposite direction from that of the liquid effluent through the ebullition zones.

8. The process of treating hydrocarbon gas comprising contacting the gas with an absorption liquid in a first absorption zone, passing the effluent of the first absorption zone through a plurality of ebullition zones in series, passing the vaporous effluent of each ebullition zone to separate reabsorption zones, passing a second absorption liquid through the reabsorption zones in series but in the opposite direction from that of the liquid effluent through the ebullition zones, and passing the vaporous effluent of each reabsorption zone to the next reabsorption zone upstream with respect to the flow of the second absorption liquid.

HAROLD R. LEGATSKI.
WILL SWERDLOFF.
GERALD W. McCULLOUGH.